Figure 1:
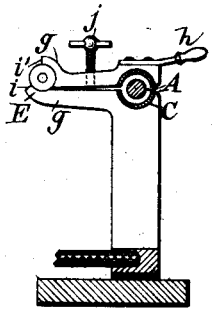

(No Model.)

M. W. DEWEY.
APPARATUS FOR WORKING METALS BY ELECTRICITY.

No. 430,839. Patented June 24, 1890.

WITNESSES:
C. L. Bendixon
J. J. Laass

INVENTOR:
Mark W. Dewey
BY
Duell, Laass & Duell
his ATTORNEYS

UNITED STATES PATENT OFFICE.

MARK W. DEWEY, OF SYRACUSE, NEW YORK, ASSIGNOR TO THE DEWEY CORPORATION, OF SAME PLACE.

APPARATUS FOR WORKING METALS BY ELECTRICITY.

SPECIFICATION forming part of Letters Patent No. 430,839, dated June 24, 1890.

Application filed April 9, 1890. Serial No. 347,165. (No model.)

*To all whom it may concern:*

Be it known that I, MARK W. DEWEY, of Syracuse, in the county Onondaga, in the State of New York, have invented new and useful Improvements in Apparatus for Electrically Heating Bars, &c., for Welding and Working Purposes, (Case No. 56,) of which the following, taken in connection with the accompanying drawings, is a full, clear, and exact description.

My invention relates to apparatus for use in my method of the application of heat to the part or parts of metal or other material to be welded, worked, or treated, consisting, essentially, in exposing or subjecting the said part or parts to be operated upon to the heat of a continuous electrically-heated conductor in proximity thereto, thereby heating the said part or parts to the required welding, working, or treating temperature.

My invention consists, further, in certain apparatus and devices, hereinafter more particularly described and claimed, and useful in practicing my method described in another application for patent filed by me October 14, 1889, Serial No. 326,937, and consisting in enveloping the part or parts to be heated and operated upon by the heating-conductor; also in preventing radiation of heat from the said heating-conductor in directions not toward said part or parts; and it consists still further in conducting the heat from the said conductor to the said part or parts through a non-electric conducting or high-resistance electric conducting medium.

My invention may be utilized for effecting all manner of welding, soldering, brazing, working, or treating operations of metals, and also for operations upon partial and non-conducting bars.

Some of the advantages of my method of heating the work for the above operations are as follows: The heat is applied directly to the exterior of the bar or blank at the point to be welded or treated and thereby heating the same to the required temperature. By thus first heating the exterior of the bar or blank I insure a perfect weld. It is a well-known fact that bars or blanks when subjected to torsional or lateral strain, the greatest strain is exerted near the surface of the bar or blank, especially when subjected to flexure, in which case the central portion constitutes the neutral axis, at which no strain is exerted, while a compressive strain is exerted at one side of the neutral axis and a tensile strain at the opposite side of said axis, and said strains gradually increase to the exterior of the bar or blank. In view of this fact it is obvious that it is more essential that the exterior of a bar be united thoroughly than the interior thereof, especially when the bar or blank is designed to resist the aforesaid strain. Therefore this method is superior to that where the heating-current is passed through the bar itself, as the interior of the bar in the latter case is heated more than the exterior on account of the radiation of heat therefrom, and thus while a good welding or union may be effected of the interior of the bar the union of the exterior is liable to be incomplete, or a burning of the interior may be caused, while the exterior is properly heated and united.

Further, by my invention bars or blanks of different sizes and conductivities can be heated without varying the volume of the current, and transformation of the current is unnecessary in many cases, or at least not to the great extent usually required, on account of the high resistance of the heating-conductor that may be employed for my method.

Figure 2:
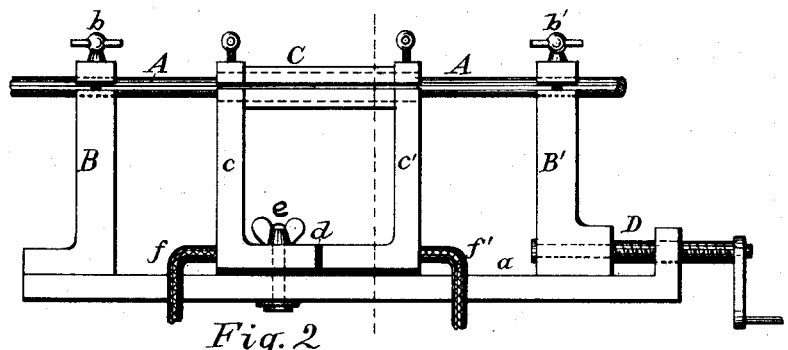
Figure 3:
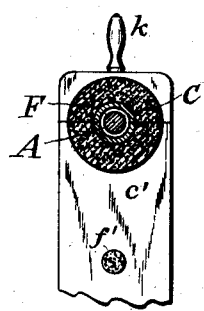
Figure 4:
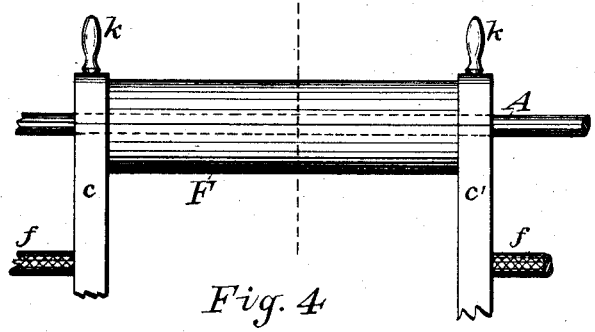
Figure 5:
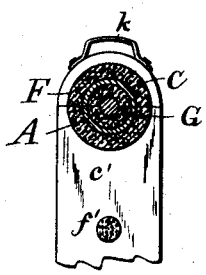
Figure 6:
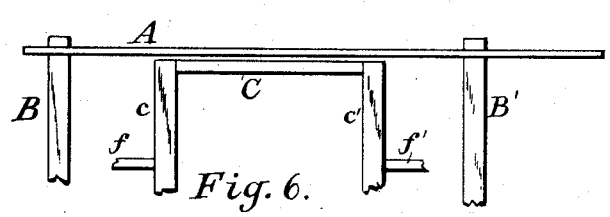
Figure 7:
Figure 8:
Figure 9:
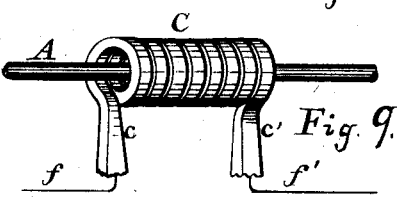

In the accompanying drawings, Figures 1 and 2 are respectively sectional and side elevations of an apparatus adapted for accomplishing my method of treating metals. Figs. 3 and 4 are respectively sectional and side elevations of another form of the heating part of said apparatus. Fig. 5 is a sectional view, similar to Fig. 3, of another form of the heating apparatus. Fig. 6 is a side elevation of a more simplified form of the apparatus shown in Fig. 2. Figs. 7 and 8 are cross-sectional views of modified forms of apparatus, and Fig. 9 shows another form of apparatus adapted for carrying out the object of my invention.

Referring specifically to the drawings, A, in Figs. 1 and 2, represents the bar or bars to be heated, worked, or welded, supported upon two supports B and B' and secured thereto by clamps $b$ and $b'$. Support B is stationary, and B' is movable toward and from the other support, so that by the moving of the support B' by means of the screw D the bar or bars held by said supports can be subjected either to compression endwise or to tension or drawing out lengthwise, as may be desired.

C is the heating-conductor located between the aforesaid supports at the point of the bar or blank A to be operated upon, and is supported by two supports $c$ and $c'$, mounted upon the base-plate $a$ of the apparatus, but insulated therefrom and from each other by insulation $d$. The heating or heat-radiating conductor C and its supports may be moved to any position or location between the supports B and B' to effect the heating of any desired point along the bar, and there fastened by means of the clamp $e$.

$f$ and $f'$ are the terminals of the heating-conductor, which may be of low resistance, and are connected to the supports $c$ and $c'$.

The heating-current to be employed may be generated by any suitable means—as, for instance, that described in my prior patents in metal-working, No. 402,416, dated April 30, 1889, and No. 408,875, dated August 13, 1889.

The supports $c$ and $c'$ form the terminals of the said heating-conductor C, which preferably envelops or surrounds the bar A and is in two parts, so that the same can be readily applied to the bar to be heated and removed from the said bar after the temperature of the work is raised to the required extent. The upper part of the conductor C is hinged to the lower part, in this case by the hinge E at the ends of the arms $g$ and $g'$, extending from the conductor C rearward, and by means of a handle $h$, extending from the said upper part toward the front of the apparatus, said part of the conductor can be easily lifted from the lower part until arrested by stops $i$ $i'$ on the hinged ends of the arms $g$ $g'$, which stops are in such positions as to sustain the lifted part in a rearwardly-inclined position and at rest. The said parts of C can be held separated more or less to allow radiation or the escape of heat therefrom to control the temperature of the bar A, or to permit the latter to be observed during the heating of the same or operation after it is heated, by means of the stop-screw $j$, extending through the arm $g'$ and resting with its lower end upon the top of the arm $g$.

The conductor C is continuous or unbroken and may be heated, of course, to any desirable extent, even to incandescence, and to prevent waste of heat said conductor may be enveloped or inclosed by a covering or envelope F of some refractory or non-heat-conducting material, such as fire-brick or asbestus, as shown in Figs. 3 and 4.

In Figs. 3 and 4 the parts of the conductor C are not hinged together; but the upper part is intended to be lifted bodily from the lower part by means of the handles $k$ $k$.

In some cases, when a very great heat is not required, this apparatus may be used without the upper part of the conductor C. Fig. 7 shows a sectional view of a modification of a similar apparatus, where neither the heating-conductor nor the non-heat-conducting material completely surrounds the bar A.

Fig. 5 illustrates a sectional view similar to Fig. 3; but the conductor C is lined with a substance G, that may be raised to incandescence and conduct the heat from the conductor C to the bar A, with which it is in contact. This substance G, forming the lining of the conductor, may be of compressed baked clay, or carbon, or other suitable substance. If composed of carbon, oxidation of the metal when heated will be prevented to a great extent. While linings formed of the substance referred to are imperfect conductors of heat, they are much better than the air and indestructible or fire-proof to a great extent, and also, on account of their high resistance, prevent the low-tension electric current employed to short-circuit through them and bar A. In some cases this lining G may not come in contact with the bar A, but simply be brought in close proximity thereto.

Fig. 8 is a modification of Fig. 5, and represents the conductor C formed into a box or trough, and the lining G formed of some granulated material, as carbon, coal, sand, or other substance, in which the bar A is buried.

In the simple form of the apparatus illustrated in Fig. 6 the heat-radiating conductor C is simply a bar or wire connected at each end to its supports $c$ and $c'$ and running along parallel with and in close proximity to the bar or blank A. The heating-conductor C in Fig. 9 is of the form of a coil, and the bar A is within the same, but not in contact therewith.

It will be obvious that the apparatus may be greatly modified without departing from the spirit of my invention, as its scope is not confined to the specific form or arrangements of apparatus shown and described herein.

Having described my invention, what I claim as new, and desire to secure by Letters Patent, is—

1. In an apparatus for electric welding and metal-working, a continuous electric heating-conductor adapted to inclose the work to which it is applied, and clamps to hold the work stationary on both sides of the heating-conductor.

2. In an apparatus for electric welding and metal-working, a continuous separable electric heating-conductor adapted to inclose the work to which it is applied.

3. In an apparatus for electric welding and metal-working, a continuous electric heating-conductor adapted to inclose the work to which it is applied, and a covering or envelope of refractory or non-heat-conducting material inclosing both the work and the conductor.

4. In an apparatus for electric welding and metal-working, a continuous electric heating-conductor arranged to envelop or surround the work to which it is applied, and clamps to hold the work stationary while being heated.

5. In an apparatus for electric welding and metal-working, a continuous electric heating-conductor adapted to inclose the work and provided with a lining of semi-conducting material.

6. In an apparatus for electric welding and metal-working, a continuous electric heating-conductor adapted to inclose the work and provided with a lining of carbon.

7. In an apparatus for electric welding and metal-working, a continuous electric heating-conductor arranged to inclose the work and supported independently of the latter and connected in circuit with a suitable source of electricity.

8. In an apparatus for electric welding and metal-working, a continuous electric heating-conductor arranged to inclose the work and connected in circuit with a suitable source of electricity, and means to move the work independently of the heating-conductor.

9. In an apparatus for electric welding and metal-working, a continuous electric heating-conductor arranged to envelop or surround the work to which it is applied, and clamps to hold the work stationary while being heated, and means to move one of said clamps, as desired.

10. In an apparatus for electric welding and metal-working, a continuous electric heating-conductor arranged to envelop or surround the work to which it is applied, means to hold the work stationary while being heated, and means for exerting a regulable movement of the work.

11. In an apparatus for electric welding and metal-working, a continuous electric heating-conductor arranged to inclose the work and connected in circuit with a suitable source of electricity and adapted to be moved and applied to different parts of the work, as desired.

12. In an apparatus for electric welding and metal-working, a continuous electric heating-conductor adapted to inclose the work and provided with a lining of powdered or granulated semi-conducting material.

In testimony whereof I have hereunto signed my name this 7th day of April, 1890.

MARK W. DEWEY. [L. S.]

Witnesses:
   C. H. DUELL,
   H. M. SEAMANS.